United States Patent
McKinzie et al.

(10) Patent No.: US 10,975,959 B2
(45) Date of Patent: Apr. 13, 2021

(54) TRANSMISSION CLUTCH BRAKING CONTROL SYSTEM

(71) Applicant: Deere & Company, Moline, IL (US)

(72) Inventors: Kyle K. McKinzie, Altamont, KS (US); Clayton G. Janasek, Independence, KS (US)

(73) Assignee: DEERE & COMPANY, Moline, IL (US)

( * ) Notice: Subject to any disclaimer, the term of this patent is extended or adjusted under 35 U.S.C. 154(b) by 1 day.

(21) Appl. No.: 16/371,598

(22) Filed: Apr. 1, 2019

(65) Prior Publication Data

US 2020/0309258 A1 Oct. 1, 2020

(51) Int. Cl.
| | | |
|---|---|---|
| *F16H 61/02* | (2006.01) | |
| *F16H 59/70* | (2006.01) | |
| *F16H 59/36* | (2006.01) | |

(52) U.S. Cl.
CPC ......... *F16H 61/0213* (2013.01); *F16H 59/36* (2013.01); *F16H 59/70* (2013.01); *F16H 2059/366* (2013.01); *F16H 2059/708* (2013.01); *F16H 2061/0237* (2013.01)

(58) Field of Classification Search
CPC ......... F16H 2059/366; F16H 2059/708; F16H 2059/0256; F16H 2059/088; F16H 59/70; F16H 61/0213; F16H 61/0059; F16H 61/21; F16H 2061/0237; F16H 2312/09
See application file for complete search history.

(56) References Cited

U.S. PATENT DOCUMENTS

| | | | |
|---|---|---|---|
| 3,214,987 | A | 11/1965 | Schenck et al. |
| 3,626,787 | A | 12/1971 | Singer |
| 3,651,904 | A | 3/1972 | Snoy et al. |
| 3,714,845 | A | 2/1973 | Mooney, Jr. |
| 3,783,711 | A | 1/1974 | Orshansky, Jr. |
| 4,090,414 | A | 5/1978 | White |

(Continued)

FOREIGN PATENT DOCUMENTS

| | | |
|---|---|---|
| CN | 101255907 A | 9/2008 |
| CN | 102844588 A | 12/2012 |

(Continued)

OTHER PUBLICATIONS

USPTO, Non-Final Office Action issued in pending U.S. Appl. No. 15/971,867 dated Dec. 12, 2019.

(Continued)

*Primary Examiner* — Edwin A Young

(74) *Attorney, Agent, or Firm* — Klintworth & Rozenblat IP LLP; Steven J. Wietrzny

(57) ABSTRACT

A control system operates a power train of a work vehicle. The system includes a transmission arrangement which transfers power from an engine to an output shaft of the vehicle to drive the vehicle in a first or second direction according to at least one forward or reverse modes. The arrangement includes a forward directional clutch and a reverse directional clutch, and a controller. The controller is configured to determine if one of the clutches is engaged; evaluate a speed of the engine; and provide a torque command to engage the other of the clutches to slow the speed of the engine when a shuttle shift is initiated, or when the speed of the engine exceeds a predetermined speed threshold.

20 Claims, 4 Drawing Sheets

(56) References Cited

U.S. PATENT DOCUMENTS

| | | | |
|---|---|---|---|
| 4,164,155 A | 8/1979 | Reed et al. |
| 4,164,156 A | 8/1979 | Reed |
| 4,989,470 A | 2/1991 | Bulgrien |
| 5,156,577 A | 10/1992 | Fredriksen et al. |
| 5,353,662 A | 10/1994 | Vaughters |
| 5,508,574 A | 4/1996 | Vlock |
| 5,931,757 A | 8/1999 | Schmidt |
| 6,394,925 B1 | 5/2002 | Wontner et al. |
| 6,478,705 B1 | 11/2002 | Holmes et al. |
| 6,684,148 B2 | 1/2004 | Chess |
| 7,008,342 B2 | 3/2006 | Dyck et al. |
| 7,252,611 B2 | 8/2007 | Raghavan et al. |
| 7,294,079 B2 | 11/2007 | Raghavan et al. |
| 7,311,627 B2 | 12/2007 | Tarasinski |
| 7,329,201 B2 | 2/2008 | Raghavan et al. |
| 7,367,911 B2 | 5/2008 | Raghavan et al. |
| 7,377,876 B2 | 5/2008 | Yang |
| 7,399,246 B2 | 7/2008 | Holmes et al. |
| 7,465,251 B2 | 12/2008 | Zhang |
| 7,473,201 B2 | 1/2009 | Raghavan |
| 7,479,081 B2 | 1/2009 | Holmes |
| 7,491,144 B2 | 2/2009 | Conlon |
| 7,901,314 B2 | 3/2011 | Salvaire et al. |
| 7,942,776 B2 | 5/2011 | Conlon |
| 8,234,956 B2 | 8/2012 | Love et al. |
| 8,257,213 B2 | 9/2012 | Komada et al. |
| 8,469,127 B2 | 6/2013 | Tarasinski et al. |
| 8,500,585 B2 | 8/2013 | Kim et al. |
| 8,544,964 B2 | 10/2013 | Rekow et al. |
| 8,573,340 B2 | 11/2013 | Tarasinski et al. |
| 8,579,751 B2 | 11/2013 | Phillips |
| 8,596,157 B2 | 12/2013 | Vu |
| 8,660,724 B2 | 2/2014 | Tarasinski et al. |
| 8,734,281 B2 | 5/2014 | Ai et al. |
| 8,747,266 B2 | 6/2014 | Aitzetmueller |
| 8,784,246 B2 | 7/2014 | Treichel |
| 8,790,202 B2 | 7/2014 | Sakai et al. |
| 8,944,194 B2 | 2/2015 | Glaser et al. |
| 8,986,162 B2 | 3/2015 | Dix et al. |
| 9,002,560 B2 | 4/2015 | Hasegawa |
| 9,097,342 B2 | 8/2015 | Dix et al. |
| 9,206,885 B2 | 12/2015 | Rekow |
| 9,487,073 B2 | 11/2016 | Love |
| 9,562,592 B2 | 2/2017 | Rekow et al. |
| 9,944,163 B2 | 4/2018 | McKinzie |
| 9,981,665 B2 | 5/2018 | Rekow et al. |
| 10,119,598 B2 | 11/2018 | Rekow et al. |
| 2003/0186769 A1 | 10/2003 | Ai et al. |
| 2004/0094381 A1 | 5/2004 | Versteyhe |
| 2005/0049100 A1 | 3/2005 | Ai et al. |
| 2006/0046886 A1 | 3/2006 | Holmes et al. |
| 2006/0111212 A9 | 5/2006 | Ai et al. |
| 2006/0142104 A1 | 6/2006 | Saller |
| 2006/0276291 A1 | 12/2006 | Fabry et al. |
| 2007/0021256 A1 | 1/2007 | Klemen et al. |
| 2007/0021257 A1 | 1/2007 | Klemen et al. |
| 2007/0249455 A1 | 10/2007 | Hasegawa et al. |
| 2010/0048338 A1 | 2/2010 | Si |
| 2010/0179009 A1 | 7/2010 | Wittkopp et al. |
| 2010/0261565 A1 | 10/2010 | Ai et al. |
| 2011/0130235 A1 | 6/2011 | Phillips |
| 2012/0157254 A1 | 6/2012 | Aitzetmueller |
| 2013/0023370 A1 | 1/2013 | Grad et al. |
| 2014/0018201 A1 | 1/2014 | Tolksdorf |
| 2014/0128196 A1 | 5/2014 | Rintoo |
| 2014/0248986 A1 | 9/2014 | Ineeramantry et al. |
| 2014/0315685 A1* | 10/2014 | Hofler ............. F16H 59/42 477/115 |
| 2015/0006007 A1 | 1/2015 | Kitahata |
| 2015/0072823 A1 | 3/2015 | Rintoo |
| 2015/0142232 A1 | 5/2015 | Tabata et al. |
| 2015/0183436 A1 | 7/2015 | Rekow et al. |
| 2015/0184726 A1 | 7/2015 | Rekow et al. |
| 2015/0292608 A1 | 10/2015 | McKinzie |
| 2016/0090091 A1 | 3/2016 | Gugel et al. |
| 2016/0201295 A1 | 7/2016 | Kishimoto et al. |
| 2016/0272059 A1 | 9/2016 | Watanabe et al. |
| 2017/0102059 A1 | 4/2017 | Rekow et al. |
| 2017/0284508 A1 | 10/2017 | Devreese |
| 2017/0284517 A1 | 10/2017 | Rekow et al. |
| 2017/0328453 A1 | 11/2017 | McKinzie et al. |
| 2018/0043764 A1 | 2/2018 | McKinzie et al. |
| 2018/0149247 A1 | 5/2018 | Rekow et al. |
| 2018/0298993 A1 | 10/2018 | Fliearman et al. |

FOREIGN PATENT DOCUMENTS

| | | |
|---|---|---|
| DE | 1173348 B | 7/1964 |
| DE | 4010919 A1 | 10/1991 |
| DE | 19621200 A1 | 11/1997 |
| DE | 19954636 A1 | 5/2001 |
| DE | 10128076 A1 | 12/2002 |
| DE | 10319252 A1 | 11/2004 |
| DE | 112006002537 T5 | 9/2008 |
| DE | 202009007972 U1 | 6/2010 |
| DE | AT11545 U1 | 12/2010 |
| DE | 102010021846 A1 | 12/2011 |
| DE | 10201102210 A1 | 7/2012 |
| DE | 102011102184 A1 | 7/2012 |
| DE | 10201105868 A1 | 1/2013 |
| DE | 102011115002 A1 | 4/2013 |
| DE | 102013220167 A1 | 4/2015 |
| DE | 202015102282 U1 | 6/2015 |
| DE | 19214225298 A1 | 7/2015 |
| DE | 102015215461 A1 | 2/2016 |
| DE | 102015200973 A1 | 7/2016 |
| DE | 102016120965 A1 | 5/2017 |
| DE | 102016204727 A1 | 9/2017 |
| DE | 102006041160 A1 | 9/2018 |
| DE | 102018108510 A1 | 10/2018 |
| DE | 102018212712 A1 | 1/2019 |
| EP | 0708276 B1 | 4/1996 |
| EP | 805059 A2 | 5/1997 |
| EP | 1099882 A2 | 5/2001 |
| EP | 1707416 B1 | 8/2007 |
| EP | 02466168 | 6/2012 |
| EP | 02466169 | 6/2012 |
| EP | 2855226 B1 | 9/2018 |
| WO | 2008019799 A2 | 2/2008 |
| WO | 2011092643 A1 | 8/2011 |
| WO | 2012171812 | 12/2012 |

OTHER PUBLICATIONS

USPTO, Non-Final Office Action issued in pending U.S. Appl. No. 15/628,979 dated Nov. 3, 2019.

German Search Report for application No. 102019204706.8 dated Dec. 17, 2019.

German Search Report for application No. 102019205211 dated Sep. 5, 2019.

USPTO Final Office Action issued in Utility U.S. Appl. No. 15/971,867 dated Jun. 24, 2020.

Deere & Company, Utility U.S. Appl. No. 15/971,867, filed May 4, 2018.

Deere & Company, Utility U.S. Appl. No. 15/879,796, filed Jan. 25, 2019.

German Search Report for application No. 10215206174 dated Jul. 16, 2015.

German Search Report for application No. 1020182036705 dated Dec. 20, 2018.

German Search Report for application No. 102018210616 dated Feb. 1, 2019.

German Search Report for application No. 1020182099391 dated Feb. 27, 2019.

German Search Report for application No. 1020182099405 dated Feb. 28, 2019.

German Search Report for application No. 102018212712 dated Apr. 12, 2019.

CNIPA Office Action for Application No. 201510165982.4 dated Aug. 9, 2018, Serial Notice No. 2018080601675890.

(56) References Cited

OTHER PUBLICATIONS

USPTO, Office Action in U.S. Appl. No. 14/536,097 dated Sep. 25, 2017.
USPTO, Office Action in U.S. Appl. No. 15/664,289 dated Jul. 26, 2018.
USPTO, Office Action in U.S. Appl. No. 14/249,258 dated Apr. 21, 2017.
USPTO, Office Action in U.S. Appl. No. 15/664,289 dated Dec. 13, 2018.
USPTO, Office Action in U.S. Appl. No. 14/249,258 dated Oct. 17, 2016.
USPTO, Office Action in U.S. Appl. No. 14/249,258 dated Aug. 22, 2017.
USPTO, Office Action in U.S. Appl. No. 15/485,911 dated Feb. 8, 2019.
USPTO, Office Action in U.S. Appl. No. 15/793,522 dated Apr. 18, 2019.
USPTO, Office Action in U.S. Appl. No. 15/879,796 dated Aug. 23, 2019.
Schmetz, Roland, Electromechanische Traktorgetriebe Getriebe mit Zukunft, Electromechanical Tractor Units—Gearboxes with a Future, Landtechnik, Agricultural Engineering, vol. 54; Issue 2; pp. 72-73, Feb. 1999.
John M. Miller, Hybrid Electric Vehicle Propulsion System Architectures of the e-CVT Type, IEEE Transactions on Power Electronics, vol. 21, No. 3, May 2006.
Jian Dong, Zuomin Dong, Curran Crawford, Review of Continuously Variable Transmission Powertrain System for Hybrid Electric Vehicles, Proceedings of the ASME 2011 International Mechanical Engineering Congress & Exposition, IMECE2011-63321, Nov. 11-17, 2011.
Deere & Company, Utility U.S. Appl. No. 15/977,242, filed May 11, 2018.
German Search Report issued in counterpart application No. 102020202651.3 dated Sep. 1, 202 (08 pages).
USPTO, Non-Final Office Action issued in U.S. Appl. No. 16/555,913 dated Jan. 4, 2021.

\* cited by examiner

TRANSMISSION CLUTCH BRAKING CONTROL SYSTEM

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure generally relates a control system for a work vehicle, and more specifically to a control system for transmission clutch braking of the work vehicle.

BACKGROUND OF THE DISCLOSURE

In a common mode of operation referred to as a shuttle shift, the direction of movement of the work vehicle is changed, often under load, a common example of which being when a tractor loader moves in one direction to pick or scoop up a load, then lifts the load and reverses direction, often involving a turning movement, and unloads the load. This sequence is then reversed, and is often repeated many times. As the transmission slows to implement the shuttle shift, excess energy in the form of negative torque may be applied to the engine. A similar situation may occur when the vehicle is travelling down an incline in that, although gravity is urging the vehicle to speed up, drive strategies may attempt to maintain a particular speed, thereby resulting in the transmission applying a negative torque and further resulting in excess energy at the engine. During shuttle shifts and other such dynamic events, it is desirable to dissipate any excess energy within the vehicle or power train, and it is desirable to perform this function in an efficient manner with respect to cost and energy.

SUMMARY OF THE DISCLOSURE

The disclosure provides a transmission clutch braking control system for a work vehicle.

In one aspect, the disclosure provides a control system which operates a power train of a work vehicle. The system includes a transmission arrangement which transfers power from an engine to an output shaft of the vehicle to drive the vehicle in a first or second direction according to at least one forward or reverse modes. The arrangement includes a forward directional clutch and a reverse directional clutch, and a controller. The controller is configured to determine if one of the clutches is engaged; evaluate a speed of the engine; and provide a torque command to engage the other of the clutches to slow the speed of the engine when a shuttle shift is initiated, or when the speed of the engine exceeds a predetermined speed threshold.

The details of one or more embodiments are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
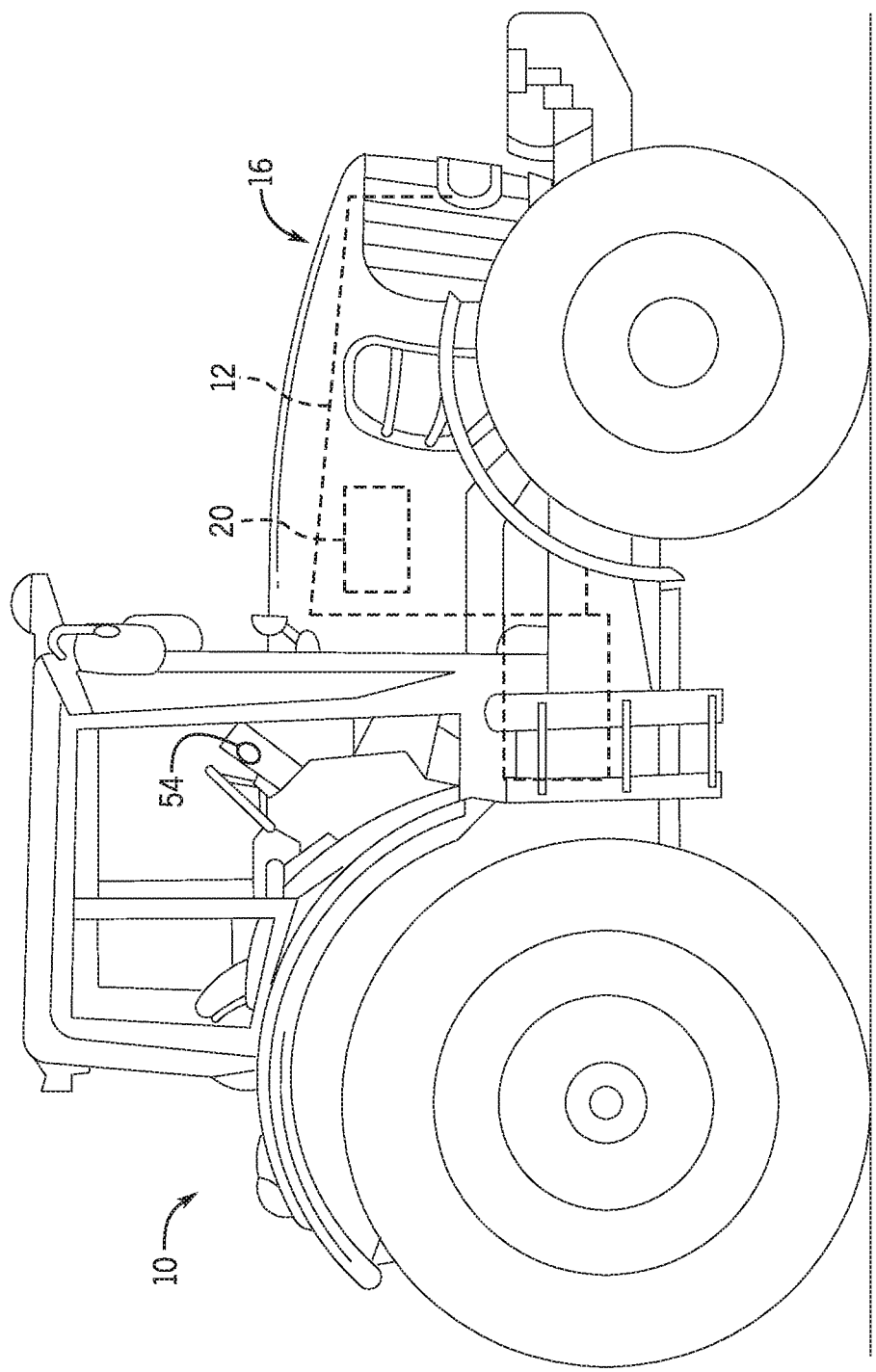
FIG. 1 is a side view of an example work vehicle which uses the transmission clutch braking control system in accordance with this disclosure.

The following describes one or more example embodiments of the disclosed power train (or vehicle), as shown in the accompanying figures of the drawings described briefly above. Various modifications to the example embodiments may be contemplated by one of skill in the art.

For convenience of notation, "component" may be used herein, particularly in the context of a planetary gear set, to indicate an element for transmission of power, such as a sun gear, a ring gear, or a planet gear carrier. Further, references to a "continuously" variable transmission, power train, or power source will be understood to also encompass, in various embodiments, configurations including an "infinitely" variable transmission, power train, or power source.

In the discussion below, various example configurations of shafts, gears, and other power transmission elements are described. It will be understood that various alternative configurations may be possible, within the spirit of this disclosure. For example, various configurations may utilize multiple shafts in place of a single shaft (or a single shaft in place of multiple shafts), may interpose one or more idler gears between various shafts or gears for the transmission of rotational power, and so on.

As used herein, "direct" or "directly" may be used to indicate power transmission between two system elements without an intervening conversion of the power to another form. For example, power may be considered as "directly" transmitted by an engine to an output component if the power is transferred via a number of shafts, clutches, and gears (e.g., various spur, bevel, summing or other gears) without being converted to a different form by a CVP (e.g., without being converted to electrical or hydraulic power by an electrical generator or a hydraulic pump). In certain configurations, fluidic transfer of rotational power by a torque converter may also be considered "direct."

In contrast, power may not be considered as "directly" transmitted between two system elements if some portion of the power is converted to another form during transmission. For example, power may not be considered as "directly" transmitted between an engine and an output component if a portion of the engine's power is converted to a different form by a CVP, even if that portion is later reconverted to rotational power (e.g., by another CVP) and then recombined with the unconverted engine power (e.g., by a summing planetary gear or other summing assembly).

Also, as used herein, "between" may be used with reference to a particular sequence or order of power transmission elements, rather than with regard to physical orientation or placement of the elements. For example, a clutch device may be considered as being "between" an engine and an output component if power is routed to the output component via the clutch device, whether or not the engine and the output component are on physically opposite sides of the clutch device.

A transmission clutch braking control system is implemented on a vehicle having a power train. The transmission clutch braking control system is used to dissipate vehicle energy during a dynamic event, such as a shuttle shift or when the vehicle is traveling on an incline to slow the engine of the vehicle down at the desired rate. In some hybrid electric transmissions (or Electric Infinitely Variable Transmissions (eIVTs)), a brake resistor has been used to dissipate this excess energy. However, a brake resistor and supporting infrastructure are expensive components that can also be cumbersome to locate and package on a vehicle such as a wheel loader. According to the disclosure below, the transmission clutch braking control system allows for kinetic energy to be placed onto the engine flywheel, and then brings on a "4-squaring" clutch to dissipate excess energy. By first putting the energy onto the engine flywheel, overall system efficiency is maximized, and by then dissipating the excess system energy across a clutch, the energy is consumed with existing transmission hardware. By using the transmission clutch braking control system of the present disclosure, the transmission clutch hardware is used to dissipate the energy as heat during normal vehicle operations, typically without using a brake resistor, thereby improving packaging and cost.

The transmission clutch braking control system includes a forward directional clutch, a reverse directional clutch, and a controller. During a dynamic event in which it is desirable to dissipate energy, such as during a shuttle shift or travel of the vehicle down an incline, the controller determines if one of the directional clutches is engaged and provides a torque command to engage the other directional clutch to slow the speed of the engine in response to a determination that a shuttle shift is being performed or only in response to a determination that a speed of the engine exceeds a predetermined speed threshold. Such a determination may be based solely on one or both of these parameters and independently of vehicle speed or vehicle deceleration. After the engagement of the other directional clutch, the controller is further configured to determine if the speed of the engine meets or is below the predetermined speed threshold; and if the speed of the engine does not meet or is not below the predetermined speed threshold, the other directional clutch is further engaged. When the controller determines that the speed of the engine meets or is below the predetermined speed threshold, the other directional clutch is disengaged. The transmission clutch braking control system may be independent of the vehicle brakes, and application of the vehicle brakes does not actuate the transmission clutch braking control system.

For example, when the vehicle is engaging in a shuttle shift from a forward direction to a reverse direction, the controller determines that such a shuttle shift has occurred and determines that the forward directional clutch is engaged. In response, the controller provides a torque command to engage the reverse directional clutch to slow the speed of the engine. After the engagement of the reverse directional clutch, the controller determines the speed of the engine and only if the controller determines that the speed of the engine meets or is below the predetermined speed threshold, the reverse directional clutch is disengaged. In addition, after the engagement of the reverse directional clutch, if the controller determines that the speed of the engine continues to exceed the predetermined speed threshold, the torque command applied to the reverse directional clutch is increased until the controller determines that the speed of the engine meets or is below the predetermined speed threshold. Once the controller determines that the speed of the engine meets or is below the predetermined speed threshold, the reverse directional clutch is disengaged.

For example, when the vehicle is engaging in a shuttle shift from a reverse direction to a forward direction, the controller determines that such a shuttle shift has occurred and determines that the reverse directional clutch is engaged. In response, the controller provides a torque command to engage the forward directional clutch to slow the speed of the engine. After the engagement of the forward directional clutch, the controller determines the speed of the engine and only if the controller determines that the speed of the engine meets or is below the predetermined speed threshold, the forward directional clutch is disengaged. In addition, after the engagement of the forward directional clutch, if the controller determines that the speed of the engine continues to exceed the predetermined speed threshold, the torque command applied to the forward directional clutch is increased until the controller determines that the speed of the engine meets or is below the predetermined speed threshold. Once the controller determines that the speed of the engine meets or is below the predetermined speed threshold, the forward directional clutch is disengaged.

For example, when the vehicle is traveling down an incline or is otherwise undergoing a situation in which vehicle travel may backdrive the engine, the controller identifies the situation and determines if the directional clutch in the direction of travel is engaged. If the controller further determines that the speed of the engine exceeds the predetermined speed threshold, the controller provides a torque command to engage the other directional clutch to slow the speed of the engine. After the engagement of the other directional clutch, the controller determines the speed of the engine and only if the controller determines that the speed of the engine meets or is below the predetermined speed threshold, the other directional clutch is disengaged. In addition, after the engagement of the other directional clutch, if the controller determines that the speed of the engine continues to exceed the predetermined speed threshold, the torque command applied to the other directional clutch is increased until the controller determines that the speed of the engine meets or is below the predetermined speed threshold. Once the controller determines that the speed of the engine meets or is below the predetermined speed threshold, the other directional clutch is disengaged.

Referring to FIG. 1, a transmission clutch braking control system 16 is provided and is implemented on a controller 20 of a vehicle 10 which is used to control components of a power train 12 of the vehicle 10. Generally, the power train 12 includes one or more engines, motors, batteries, and power transfer elements to power the vehicle 10 in forward and reverse directions, as well as to provide mechanical or electrical power to various additional systems of the vehicle 10. As described in greater detail below, the transmission clutch braking control system 16 is used to dissipate vehicle and/or power train energy during a dynamic event, such as during a shuttle shift or when the vehicle 10 is traveling on an incline. In one example, the transmission clutch braking control system 16 is used regardless of whether the brakes of the vehicle 10 are applied; and application of the brakes of the vehicle 10 does not actuate the transmission clutch braking control system 16.

In FIG. 1, the vehicle 10 is depicted as a tractor. It will be understood, however, that other configurations may be possible, including configurations with vehicle 10 as a different kind of tractor, a harvester, a log skidder, a grader, or one of various other work vehicle types. It will further be understood that the disclosed power train 12 may also be used in non-work vehicles and non-vehicle applications (e.g., fixed-location power installations).

Generally, the controller 20 controls operation of the transmission clutch braking control system 16, power train 12, and other aspects of the vehicle 10, including any of the functions described herein. The controller 20 may be configured as computing devices with associated processor devices and memory architectures, as hydraulic, electrical or electro-hydraulic controllers, or otherwise. As such, the controller 20 may be configured to execute various computational and control functionality with respect to the vehicle 10. The controller 20 may be in electronic, hydraulic, or other communication with various other systems or devices of the vehicle 10. For example, the controller 20 may be in electronic or hydraulic communication with various actuators, sensors, and other devices within (or outside of) the vehicle 10. Some of these sensors are discussed in greater detail below. The controller 20 may communicate with other systems or devices (including other controllers) in various known ways, including via a CAN bus (not shown) of the vehicle 10 via wireless or hydraulic communication means, or otherwise. In some embodiments, the controller 20 may be configured to receive input commands and to interface with an operator via a human-machine interface or operator interface. In addition to steering input devices; acceleration, velocity, and wheel braking controls; and other operator input devices, the vehicle 10 may further include a lever or other operator input device 54 that facilitates interaction with the power transfer elements of the power train 12, particularly those that initiate a shuttle shift, e.g., transitioning between forward and reverse travel directions.

Figure 2:
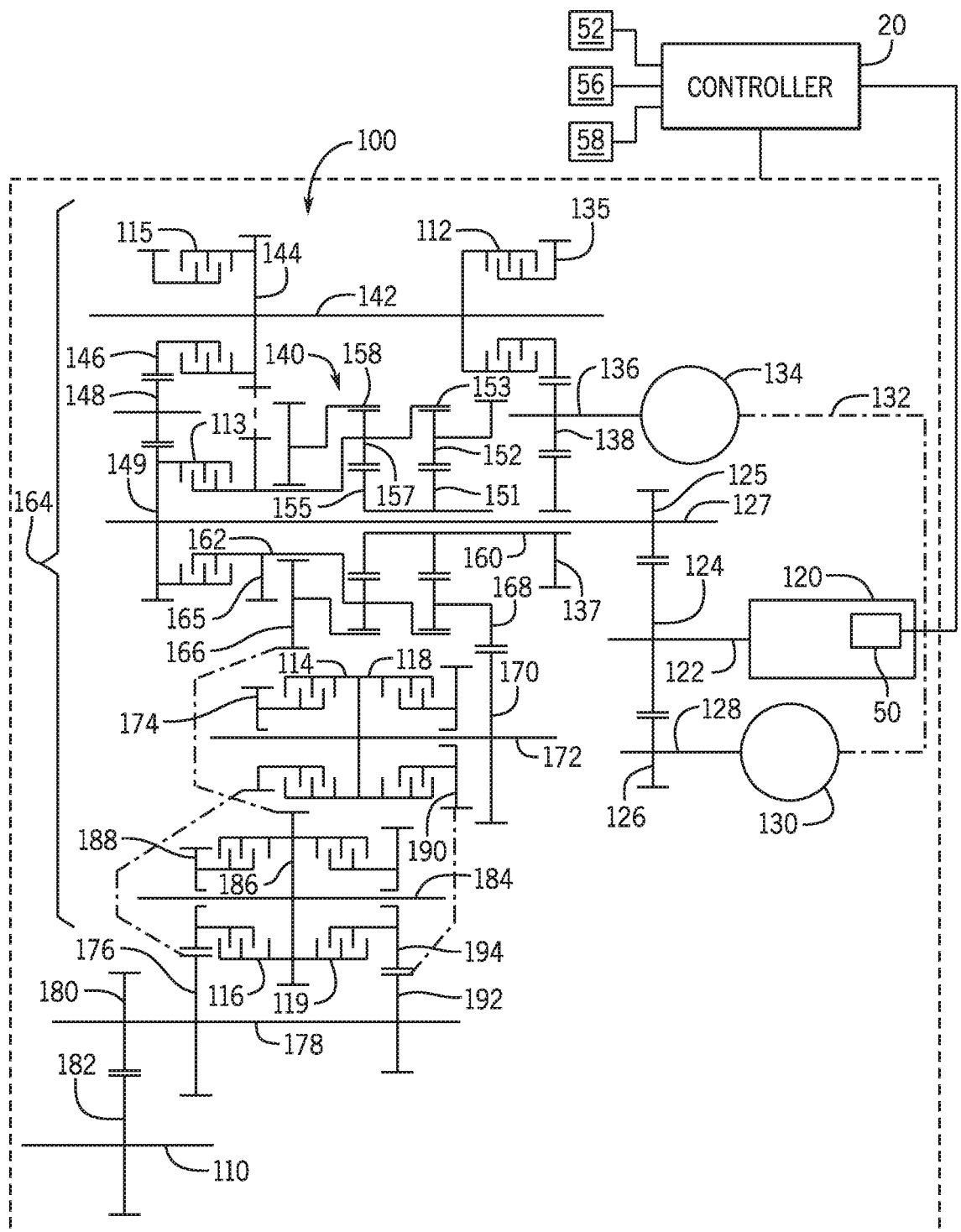
FIG. 2 is a power train of the example vehicle of FIG. 1.

Referring now to FIG. 2, an example power train 12 is depicted as implementing aspects of the transmission clutch braking control system 16. As shown and discussed in greater detail below, the power train 12 is in communication with the controller 20, which additionally receives information from sensors 50, 52, 56, 58 and lever 54 (FIG. 1). Characteristics of power train 12, including example alternatives to the depicted power train 12, may be disclosed in United States Publication No. US 2018/0043764 which is commonly owned by the assignee of the present application and incorporated herein by reference.

The power train 12 may include an engine 120, which may be an internal combustion engine of various known configurations. The power train 12 may also include a first continuously variable power source (CVP) 130 (e.g., an electrical or hydraulic motor) and a second CVP 134 (e.g., an electrical or hydraulic motor), which may be connected by a conduit 132 (e.g., an electrical or hydraulic conduit).

The power train 12 includes a transmission arrangement 100 that transfers power from the engine 120, first CVP 130, and/or second CVP 134 to an output shaft 110. As described below, the transmission arrangement 100 includes a number of gearing, clutch, and control assemblies to suitably drive the output shaft 110 at different speeds in multiple directions. Generally, in one example, the transmission arrangement 100 of power train 12 for implementing the transmission clutch braking control system 16 may be any type of infinitely variable transmission arrangement.

The engine 120 may provide rotational power via an engine output element, such as a flywheel, to an engine shaft 122 according to commands from the controller 20 based on the desired operation. The shaft 122 may be configured to provide rotational power to a gear 124. The gear 124 may be enmeshed with a gear 125, which may be supported on (e.g., fixed to) a shaft 127. The shaft 127 may be substantially parallel to and spaced apart from the engine shaft 122. The shaft 127 may support various components of the power train 12 as will be discussed in detail.

The gear 124 may also be enmeshed with a gear 126, which is supported on (e.g., fixed to) a shaft 128. The shaft 128 may be substantially parallel to and spaced apart from the engine shaft 122, and the shaft 128 may be connected to the first CVP 130. Accordingly, mechanical power from the engine (i.e., engine power) may transfer via the engine shaft 122, to the enmeshed gears 124, 126, to the shaft 128, and to the first CVP 130. The first CVP 130 may convert this power to an alternate form (e.g., electrical or hydraulic power) for transmission over the conduit 132 to the second CVP 134. This converted and transmitted power may then be re-converted by the second CVP 134 for mechanical output along a shaft 136. Various known control devices (not shown) may be provided to regulate such conversion, transmission, re-conversion, and so on. Also, in some embodiments, the shaft 136 may support a gear 138 (or other similar component). The gear 138 may be enmeshed with and may transfer power to a gear 135. The gear 138 may also be enmeshed with and may transfer power to a gear 137. Accordingly, power from the second CVP 134 (i.e., CVP power) may be divided between the gear 135 and the gear 137 for transmission to other components as will be discussed in more detail below.

The power train 12 may further include a variator 140 that represents one example of an arrangement that enables an infinitely variable power transmission between the engine 120 and CVPs 130, 134 and the output shaft 110. As discussed below, this arrangement further enables the transmission clutch braking control system 16 in which excess energy is dissipated by a combination of transferring at least a portion of the energy back to the engine 120 and a portion to clutch braking. However, other arrangements of the variator 140, engine 120, and CVPs 130, 134 may be provided.

In some embodiments, the variator 140 may include at least two planetary gearsets. In some embodiments, the planetary gearset may be interconnected and supported on a common shaft, such as the shaft 127, and the planetary gearsets may be substantially concentric. In other embodiments, the different planetary gearsets may be supported on separate, respective shafts that are nonconcentric. The arrangement of the planetary gearsets may be configured according to the available space within the vehicle 10 for packaging the power train 12.

As shown in the embodiment of FIG. 2, the variator 140 may include a first planetary gearset (i.e., a "low" planetary gearset) with a first sun gear 151, first planet gears and associated carrier 152, and a first ring gear 153. Moreover, the variator 140 may include a second planetary gearset (i.e., a "high" planetary gearset) with a second sun gear 155, second planet gears and associated carrier 157, and a second ring gear 158. The second planet gears and carrier 157 may be directly attached to the first ring gear 153. Also, the second planet gears and carrier 157 may be directly attached to a shaft 162 having a gear 165 fixed thereon. Moreover, the second ring gear 158 may be directly attached to a gear 166. As shown, the shaft 162, the gear 165, and the gear 166 may each receive and may be substantially concentric to the shaft 127. Although not specifically shown, it will be appreciated that the power train 12 may include various bearings for supporting these components concentrically. Specifically, the shaft 162 may be rotationally attached via a bearing to the shaft 127, and the gear 166 may be rotationally attached via another bearing on the shaft 162.

On the opposite side of the variator 140 (from left to right in FIG. 2), the gear 137 may be mounted (e.g., fixed) on a shaft 160, which also supports the first and second sun gears 151, 155. In some embodiments, the shaft 160 may be hollow and may receive the shaft 127. A bearing (not shown) may rotationally support the shaft 160 on the shaft 127 substantially concentrically.

Furthermore, the first planet gears and associated carrier 152 may be attached to a gear 168. The gear 168 may be enmeshed with a gear 170, which is fixed to a shaft 172. The shaft 172 may be substantially parallel to and spaced apart from the shaft 127.

As noted above, the power train 12 may be configured for delivering power (from the engine 120, the first CVP 130, and/or the second CVP 134) to the output shaft 110 or other output component via the transmission arrangement 100. The output shaft 110 may be configured to transmit this received power to wheels of the vehicle 10, to a power take-off (PTO) shaft, to a range box, to an implement, or other component of the vehicle 10.

The power train 12 may have a plurality of selectable modes, such as a direct drive mode, a split path mode, and a series mode. In the direct drive mode, power from the engine 120 may be transmitted to the output shaft 110, and power from the second CVP 134 may be prevented from transferring to the output shaft 110. In the split path mode, power from the engine 120 and the second CVP 134 may be summed by the variator 140, and the summed or combined power may be delivered to the output shaft 110. Moreover, in the series mode, power from the second CVP 134 may be transmitted to the output shaft 110 and power from the engine 120 may be prevented from transferring to the output shaft 110. The power train 12 may also have different speed modes in one more of the direct drive, split path, and series modes, and these different speed modes may provide different angular speed ranges for the output shaft 110. The power train 12 may switch between the plurality of modes to maintain suitable operating efficiency. Furthermore, the power train 12 may have one or more forward modes for moving the vehicle 10 in a forward direction one or more reverse modes for moving the vehicle 10 in a reverse direction.

The power train 12 may switch between the different modes, for example, using a control assembly 164. The control assembly 164 may include one or more selectable transmission components. The selectable transmission components may have first positions (engaged positions), in which the respective device transmits power from an input component to an output component. The selectable transmission components may also have a second position (a disengaged position), in which the device prevents power transmission from the input to the output component. The selectable transmission components of the control assembly 164 may include one or more wet clutches, dry clutches, dog collar clutches, brakes, synchronizers, or other similar devices. The control assembly 164 may also include an actuator for actuating the selectable transmission components between the first and second positions.

As shown in FIG. 2, the control assembly 164 may include a first clutch 112, a second clutch 114, a third clutch 116, a fourth clutch 118, and a fifth clutch 119. Also, the control assembly 164 may include a forward directional clutch 113 and a reverse directional clutch 115. In some embodiments, the first clutch 112 may be mounted and supported on a shaft 142. Also, the first clutch 112, in an engaged position, may engage the gear 135 with the shaft 142 for rotation as a unit. The first clutch 112, in a disengaged position, may allow the gear 135 to rotate relative to the shaft 142. Also, a gear 144 may be fixed to the shaft 142, and the gear 144 may be enmeshed with the gear 165 that is fixed to the shaft 162. The reverse directional clutch 115 may be supported on the shaft 142 (i.e., commonly supported on the shaft 142 with the first clutch 112). The reverse directional clutch 115 may engage and, alternatively, disengage the gear 144 and a gear 146. The gear 146 may be enmeshed with an idler gear 148, and the idler gear 148 may be enmeshed with a gear 149. The forward directional clutch 113 may be supported on gear 149, which is in turn supported on the shaft 127, to selectively engage shaft 162. Thus, the forward directional clutch 113 may be concentric with both the shaft 162 and the shaft 127. The second clutch 114 may be supported on the shaft 172. The second clutch 114 may engage and, alternatively, disengage the shaft 172 and a gear 174. The gear 174 may be enmeshed with a gear 176. The gear 176 may be fixed to and mounted on a countershaft 178. The countershaft 178 may also support a gear 180. The gear 180 may be enmeshed with a gear 182, which is fixed to the output shaft 110.

The third clutch 116 may be supported on a shaft 184. The shaft 184 may be substantially parallel and spaced at a distance from the shaft 172. Also, a gear 186 may be fixed to and supported by the shaft 184. The gear 186 may be enmeshed with the gear 166 as shown. The third clutch 116 may engage and, alternatively, disengage the gear 186 and a gear 188. The gear 188 may be enmeshed with the gear 176. The fourth clutch 118 may be supported on the shaft 172 (in common with the second clutch 114). The fourth clutch 118 may engage and, alternatively, disengage the shaft 172 and a gear 190. The gear 190 may be enmeshed with a gear 192, which is mounted on and fixed to the countershaft 178. Additionally, the fifth clutch 119 may be supported on the shaft 184 (in common with and concentric with the third clutch 116). The fifth clutch 119 may engage and, alternatively, disengage the shaft 184 and a gear 194. The gear 194 may be enmeshed with the gear 192.

The different transmission modes of the power train 12 will now be discussed. Like the embodiments discussed above, the power train 12 may have at least one at least one split-path mode in which power from the engine 120 and one or more of the CVPs 130, 134 are combined. Also, in some embodiments, the power train 12 may additionally have a direct drive mode and/or and at least one CVP-only mode (i.e., series mode).

In some embodiments, engaging the first clutch 112 and the second clutch 114 may place the power train 12 in a first forward mode. This mode may be a CVP-only mode (i.e., series mode). In this mode, mechanical power from the engine 120 may flow via the shaft 122, the gear 124, the gear 126, and the shaft 128 to the first CVP 130. The first CVP 130 may convert this input mechanical power to electrical or hydraulic power and supply the converted power to the second CVP 134. Also, power from the engine 120 that flows via the shaft 122, the gear 124, and the gear 125 to the shaft 127 is prevented from being input into the variator 140. Moreover, mechanical power from the second CVP 134 may rotate the shaft 136 and the attached gear 138. This CVP power may rotate the gear 137 for rotating the first sun gear 151. The CVP power may also rotate the gear 135, which may transfer across the first clutch 112 to the shaft 142, to the gear 144, to the gear 165, to the shaft 162, to the second planet gears and associated carrier 157, to the first ring gear 153. In other words, in this mode, power from the second CVP 134 may drivingly rotate two components of the variator 140 (the first sun gear 151 and the first ring gear 153), and the power may be summed and re-combined at the first planet gears and associated carrier 152. The re-combined power may transfer via the gear 168 and the gear 170 to the shaft 172. Power at the shaft 172 may be transferred across the second clutch 114 to the gear 174, to the gear 176, along the countershaft 178, to the gear 180, to the gear 182, and ultimately to the output shaft 110. In some embodiments, this CVP-only or series mode may provide the output shaft 110 with relatively high torque at low angular speed output. Thus, this mode may be referred to as a creeper mode in some embodiments. Furthermore, as will become evident, the first clutch 112 may be used only in this mode; therefore, the first clutch 112 may be referred to as a "creeper clutch".

It is noted that this mode is provided without a brake (i.e., brakelessly). In other words, the second CVP 134 rotates the first sun gear 151 and the first ring gear 153, and the CVP power recombines at the first planet gears and carrier 152 as a result.

Moreover, in some embodiments, engaging the forward directional clutch 113 and the second clutch 114 may place the power train 12 in a first forward directional mode. This mode may be a split-path mode in which the variator 140 sums power from the second CVP 134 and the engine 120 and outputs the combined power to the output shaft 110. Specifically, power from the second CVP 134 is transmitted from the shaft 136, to the gear 138, to the gear 137, to the shaft 160, to drive the first sun gear 151. Also, power from the engine 120 is transmitted to the shaft 122, to the gear 124, to the gear 125, to the shaft 127, to the gear 149, through the forward directional clutch 113, to the shaft 162, to the second planet gears and associated carrier 157 to the first ring gear 153. Combined power from the second CVP 134 and the engine 120 is summed at the first planet gears and the associated carrier 152 and is transmitted via the gear 168 and the gear 170 to the shaft 172. Power at the shaft 172 may be transferred across the second clutch 114 to the gear 174, to the gear 176, along the countershaft 178, to the gear 180, to the gear 182, and ultimately to the output shaft 110.

Additionally, in some embodiments, engaging the forward directional clutch 113 and the third clutch 116 may place the power train 12 in a second forward directional mode as a further split-path mode. Specifically, power from the second CVP 134 may be transmitted from the shaft 136, to the gear 138, to the gear 137, to the shaft 160, to drive the second sun gear 155. Also, power from the engine 120 is transmitted to the shaft 122, to the gear 124, to the gear 125, to the shaft 127, to the gear 149, through the forward directional clutch 113, to the shaft 162, to the second planet gears and associated carrier 157. Combined power from the second CVP 134 and the engine 120 may be summed at the second ring gear 158, and may be transmitted to the gear 166, to the gear 186, through the third clutch 116, to the gear 188, to the gear 176, to the countershaft 178, to the gear 180, to the gear 182, and ultimately to the output shaft 110.

In addition, in some embodiments, engaging the forward directional clutch 113 and the fourth clutch 118 may place the power train 12 in a third forward directional mode as a further split-path mode. Specifically, power from the second CVP 134 is transmitted from the shaft 136, to the gear 138, to the gear 137, to the shaft 160, to drive the first sun gear 151. Also, power from the engine 120 is transmitted to the shaft 122, to the gear 124, to the gear 125, to the shaft 127, to the gear 149, through the forward directional clutch 113, to the shaft 162, to the second planet gears and associated carrier 157, to the first ring gear 153. Combined power from the second CVP 134 and the engine 120 is summed at the first planet gears and the associated carrier 152 and is transmitted via the gear 168 and the gear 170 to the shaft 172. Power at the shaft 172 may be transferred across the fourth clutch 118 to the gear 190, to the gear 192, along the countershaft 178, to the gear 180, to the gear 182, and ultimately to the output shaft 110.

Moreover, in some embodiments, engaging the forward directional clutch 113 and the fifth clutch 119 may place the power train 12 in a fourth forward directional mode as a further split-path mode. Specifically, power from the second CVP 134 may be transmitted from the shaft 136, to the gear 138, to the gear 137, to the shaft 160, to drive the second sun gear 155. Also, power from the engine 120 is transmitted to the shaft 122, to the gear 124, to the gear 125, to the shaft 127, to the gear 149, through the forward directional clutch 113, to the shaft 162, to the second planet gears and associated carrier 157. Combined power from the second CVP 134 and the engine 120 may be summed at the second ring gear 158, and may be transmitted to the gear 166, to the gear 186, through the fifth clutch 119, to the gear 194, to the gear 192, to the countershaft 178, to the gear 180, to the gear 182, and ultimately to the output shaft 110.

The power train 12 may also have one or more reverse modes for driving the vehicle 10 in the opposite (reverse) direction from those modes discussed above. In some embodiments, the power train 12 may provide a reverse CVP-only (or series) mode, which corresponds to the forward CVP-only mode discussed above in which the first clutch 112 and the second clutch 114 may be engaged such that the second CVP 134 drives the shaft 136 and the other downstream components in the opposite direction from that described above to move the vehicle 10 in reverse.

Moreover, the power train 12 may have a plurality of split-path reverse directional modes. In some embodiments, the power train 12 may provide reverse directional modes that correspond to the forward directional modes discussed above; however, the reverse directional clutch 115 may be engaged instead of the forward directional clutch 113 to achieve the reverse modes.

Accordingly, the power train 12 may provide a first reverse directional mode by engaging the reverse directional clutch 115 and the second clutch 114. As such, power from the second CVP 134 may be transmitted from the shaft 136, to the gear 138, to the gear 137, to the shaft 160, to drive the first sun gear 151. Also, power from the engine 120 may be transmitted to the shaft 122, to the gear 124, to the gear 125, to the shaft 127, to the gear 149, to the idler gear 148, to the gear 146, through the reverse directional clutch 115, to the gear 144 to the gear 165, to the shaft 162, to the second planet gears and associated carrier 157 to the first ring gear 153. Combined power from the second CVP 134 and the engine 120 may be summed at the first planet gears and the associated carrier 152 and may be transmitted via the gear 168 and the gear 170 to the shaft 172. Power at the shaft 172 may be transferred across the second clutch 114 to the gear 174, to the gear 176, along the countershaft 178, to the gear 180, to the gear 182, and ultimately to the output shaft 110.

The power train 12 may also provide a second reverse directional mode by engaging the reverse directional clutch 115 and the third clutch 116. As such, power from the second CVP 134 may be transmitted from the shaft 136, to the gear 138, to the gear 137, to the shaft 160, to drive the second sun gear 155. Also, power from the engine 120 may be transmitted to the shaft 122, to the gear 124, to the gear 125, to the shaft 127, to the gear 149, to the idler gear 148, to the gear 146, through the reverse directional clutch 115, to the gear 144, to the gear 165, to the shaft 162, to the second planet gears and associated carrier 157. Combined power from the second CVP 134 and the engine 120 may be summed at the second ring gear 158, and may be transmitted to the gear 166, to the gear 186, through the third clutch 116, to the gear 188, to the gear 176, to the countershaft 178, to the gear 180, to the gear 182, and ultimately to the output shaft 110.

In addition, in some embodiments, engaging the reverse directional clutch 115 and the fourth clutch 118 may place the power train 12 in a third reverse directional mode. Specifically, power from the second CVP 134 may be transmitted from the shaft 136, to the gear 138, to the gear 137, to the shaft 160, to drive the first sun gear 151. Also, power from the engine 120 may be transmitted to the shaft 122, to the gear 124, to the gear 125, to the shaft 127, to the gear 149, to the idler gear 148, to the gear 146, through the reverse directional clutch 115, to the gear 144, to the gear 165 to the shaft 162, to the second planet gears and associated carrier 157, to the first ring gear 153. Combined power from the second CVP 134 and the engine 120 may be summed at the first planet gears and the associated carrier 152 and may be transmitted via the gear 168 and the gear 170 to the shaft 172. Power at the shaft 172 may be transferred across the fourth clutch 118 to the gear 190, to the gear 192, along the countershaft 178, to the gear 180, to the gear 182, and ultimately to the output shaft 110.

Moreover, in some embodiments, engaging the reverse directional clutch 115 and the fifth clutch 119 may place the power train 12 in a fourth reverse directional mode. Specifically, power from the second CVP 134 may be transmitted from the shaft 136, to the gear 138, to the gear 137, to the shaft 160, to drive the second sun gear 155. Also, power from the engine 120 may be transmitted to the shaft 122, to the gear 124, to the gear 125, to the shaft 127, to the gear 149, to the idler gear 148, to the gear 146, through the reverse directional clutch 115, to the gear 144, to the gear 165, to the shaft 162, to the second planet gears and associated carrier 157. Combined power from the second CVP 134 and the engine 120 may be summed at the second ring gear 158, and may be transmitted to the gear 166, to the gear 186, through the fifth clutch 119, to the gear 194, to the gear 192, to the countershaft 178, to the gear 180, to the gear 182, and ultimately to the output shaft 110.

Furthermore, the power train 12 may provide one or more direct drive modes, in which power from the engine 120 is transferred to the output shaft 110 and power from the second CVP 134 is prevented from transferring to the output shaft 110. Specifically, engaging the second clutch 114, the third clutch 116, and the forward directional clutch 113 may provide a first forward direct drive mode. As such, power from the engine 120 may transfer from the shaft 122, to the gear 124, to the shaft 127, to the gear 149, through the forward directional clutch 113, to the second planet gears and carrier 157, and to the first ring gear 153. Moreover, with the second and third clutches 114, 116 engaged, the second ring gear 158 and the first planet gears and carrier 152 lock in a fixed ratio to the countershaft 178 and, thus, the output shaft 110. This effectively constrains the ratio of each side of the variator 140 and locks the engine speed directly to the ground speed of the vehicle 10 by a ratio determined by the tooth counts of the engaged gear train. In this scenario, the speed of the sun gears 151, 155 is fixed and the sun gears 151, 155 carry torque between the two sides of the variator 140. Furthermore, the first CVP 130 and the second CVP 134 may be unpowered.

Similarly, engaging the fourth clutch 118, the fifth clutch 119, and the forward directional clutch 113 may provide a second forward direct drive mode. Furthermore, engaging the second clutch 114, the third clutch 116, and the reverse directional clutch 115 may provide a first reverse direct drive mode. Also, engaging the fourth clutch 118, the fifth clutch 119, and the reverse directional clutch 115 may provide a second reverse direct drive mode.

As introduced above, the controller 20 is coupled to the control assembly 164 for controlling one or more actuators and, as a result, controlling movement of the one or more selective transmission components within the transmission arrangement 100, including the first clutch 112, the second clutch 114, the third clutch 116, the fourth clutch 118, the fifth clutch 119, the forward directional clutch 113 and the reverse directional clutch 115. Generally, the controller 20 operates the control assembly 164, as well as the engine 120 and CVPs 130, 134, to implement the desired function, e.g., to achieve the requested torque at the output shaft 110 for overall control of the vehicle 10. This includes vehicle accelerations, stops, starts, shifting between gear ratios, shifting between directions, and the like. As described below, the transmission clutch braking control system 16 selectively operates during aspects of these functions in situations in which it is desirable to dissipate energy, thereby conserving fuel, power, and wear on the vehicle 10.

The transmission clutch braking control system 16 may particularly be utilized during a dynamic event, such as during a shuttle shift or when operating in the direction of an incline. In these situations, the vehicle 10 is typically subject to excess energy resulting from the change of direction or from gravity. In particular, transmission control strategies during such events may attempt to apply a negative torque in order to maintain or reduce vehicle speed that may result in the excess energy at the engine.

As described in greater detail below, the transmission clutch braking control system 16 enables at least a portion of this energy to be applied via the directional clutches 113, 115 of the transmission arrangement 100 to backdrive the engine 120 at the flywheel such that internal loses (e.g., heat and friction) may dissipate at least a portion of the excess energy. However, if this energy results in the engine 120 otherwise exceeding a predetermined speed threshold, the transmission clutch braking control system 16 may command the engagement of the opposite directional clutch 115, 113 to further dissipate this energy via friction and heat losses at the directional clutch 115, 113. In effect, the transmission clutch braking control system 16 functions to selectively implement a form of a "4-squaring" clutch arrangement based on the engine speed to further slow the engine output shaft. This combination of engine backdriving and opposite directional clutch engagement may achieve sufficient energy dissipation without utilizing output-side clutch braking and/or in a manner that is independent of wheel braking. More specific examples are provided below.

With the present transmission clutch braking control system 16, during a dynamic event, such as a shuttle shift or when the speed of the engine 120 exceeds a predetermined threshold, the controller 20 is used to control the operation of the forward directional clutch 113 during the reverse directional modes (or direct drive mode) when the reverse directional clutch 115 is engaged, and the controller 20 is used to control the operation of the reverse directional clutch 115 during the forward directional modes (or direct drive mode) when the forward directional clutch 113 is engaged. This transmission clutch braking control system 16 is used regardless of whether the brakes of the vehicle 10 are applied; and application of the wheel brakes does not actuate the transmission clutch braking control system 16 and the transmission clutch braking control system 16 does not need to receive information from the vehicle 10 that the wheel brakes are being applied in order to be actuated. Operation of the transmission clutch braking control system 16 is based on engine speed and initiation of a shuttle shift. Specifically, the forward directional clutch 113 or the reverse directional clutch 115 is used to slow the speed of the engine 120 during such a dynamic event. It is to be understood that the operator of the vehicle 10 may also apply the brakes of the vehicle 10 during these dynamic events; however, the present transmission clutch braking control system 16 does not monitor the application of the brakes of the vehicle 10.

As introduced above, the controller 20 may generate commands for implementing the transmission clutch braking control system 16 based on inputs from a number of sensors 50, 52, 56, 58. Sensor 50 is operatively associated with the engine 120 and sends information relating to the speed of the engine 120 to the controller 20. Sensor 52 is operatively associated with the lever 54 in the vehicle 10 (e.g., a gear or direction selection operator input element) that the operator or automatic system actuates to cause the vehicle 10 to engage in a shuttle shift. Sensor 56 is operatively associated with the forward directional clutch 113 that sends information to the controller 20 indicating that the forward directional clutch 113 is engaged. Sensor 58 is operatively associated with the reverse directional clutch 115 that sends information to the controller 20 indicating that the reverse directional clutch 115 is engaged.

When the power train 12 is placed in the forward directional modes or the direct drive modes as described above, power from the engine 120 is transferred from the engine shaft 122 through the forward directional clutch 113 and ultimately transferred to the output shaft 110 through the described arrangement, and when the power train is placed in the reverse directional modes or the direct drive modes as described above, power from the engine 120 is transferred from the engine shaft 122 through the reverse directional clutch 115 is ultimately transferred to the output shaft 110 through the described arrangement. Therefore, when the reverse directional clutch 115 is engaged during the engagement of the forward directional clutch 113 in these modes, application of the reverse directional clutch 115 operates to apply an opposing torque to slow down the engine shaft 122. In other words, the reverse directional clutch 115 acts as a clutch brake within the power train 12 on the engine shaft 122. In one example, the reverse directional clutch 115 functions as a clutch brake in these modes since gear 146, on one side of the reverse directional clutch 115. is moving in an opposite direction as gear 144, on the other side of the reverse directional clutch 115, and engagement of the clutch elements of the reverse directional clutch 115 creates a frictional drag on the rotations, which in turn, is transferred through the shaft 127 to the shaft 122 at the engine 120.

Likewise, when the forward directional clutch 113 is engaged during the engagement of the reverse directional clutch 115 in these modes, application of the forward directional clutch 113 operates to apply an opposing torque to slow down the engine shaft 122. In other words, the forward directional clutch 113 acts as a clutch brake within the power train 12 on the engine shaft 122. In one example, the forward directional clutch 113 functions as a clutch brake in these modes since gear 149, on one side of the forward directional clutch 113, is moving in an opposite direction as gear 165 and shaft 162, on the other side of the forward directional clutch 113, and engagement of the clutch elements of the forward directional clutch 113 creates a frictional drag on the rotations, which in turn, is transferred through the shaft 127 to the shaft 122 at the engine 120.

Figure 3:
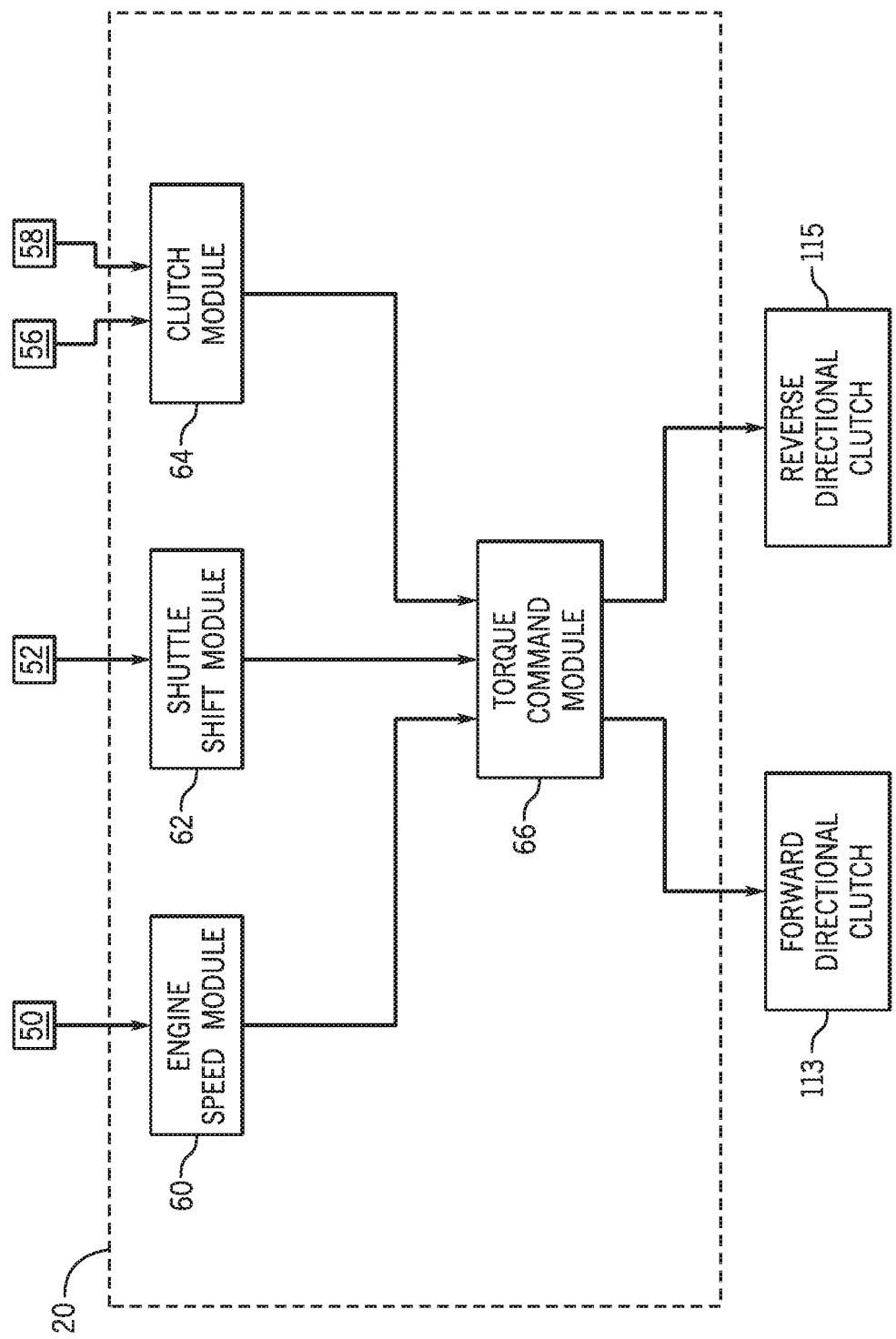
FIG. 3 is a dataflow diagram of a controller of the transmission clutch braking control system.

Referring now also to FIG. 3, a dataflow diagram illustrates an embodiment of the controller 20. Various embodiments of the controller 20 according to the present disclosure can include any number of sub-modules. As can be appreciated, the sub-modules shown in FIG. 3 can be combined and/or further partitioned to similarly output one or more control signals to the forward directional clutch 113 and the reverse directional clutch 115. In various embodiments, the controller 20 includes an engine speed module 60, a shuttle shift module 62, a clutch module 64, and a torque command module 66.

Input to the engine speed module 60 is received from the sensor 50, received from other control modules (not shown) associated with the vehicle 10, and/or determined/modeled by other sub-modules (not shown) within the controller 20. The engine speed module 60 interprets the input and outputs data to the torque command module 66 as to the speed of the engine 120.

Input to the shuttle shift module 62 is received from the sensor 52, received from other control modules (not shown) associated with the vehicle 10, and/or determined/modeled by other sub-modules (not shown) within the controller 20 in response to the operator's manipulation of the lever 54 that comprises input indicating an operator's desire to perform a shuttle shift. The shuttle shift module 62 interprets the input and outputs data to the torque command module 66 as to whether a shuttle shift has been initiated.

Input to the clutch module 64 is received from the sensors 56, 58, received from other control modules (not shown) associated with the vehicle 10, and/or determined/modeled by other sub-modules (not shown) within the controller 20 that comprises input indicating which directional clutch is engaged. The clutch module 64 interprets the input and outputs data to the torque command module 66 as to which directional clutch is engaged.

The torque command module 66 evaluates the data received from the engine speed module 60, the shuttle shift module 62, and the clutch module 64. If the data indicates that a shuttle shift is occurring and/or that the speed of the engine 120 is above the predetermined speed threshold, and that the forward directional clutch 113 is engaged, the torque command module 66 outputs a signal to the reverse directional clutch 115 to engage to engage at a selected engagement pressure or position value (or "clutch value"). Likewise, if the data indicates that a shuttle shift is occurring or that the speed of the engine 120 is above the predetermined speed threshold, and that the reverse directional clutch 115 is engaged, the torque command module 66 outputs a signal to the forward directional clutch 113 to engage at a selected clutch value. Any suitable predetermined speed threshold or clutch values may be selected. In one embodiment, the predetermined speed threshold may represent an appropriate or advantageous speed for the engine 120 to implement a shuttle shift, or generally, during operation. For example, it may be advantageous for the engine 120 to be maintained at a relatively constant speed in the hybrid power train arrangement. Similarly, the selected clutch value may represent a desirable amount of clutch braking applied to the engine 120, as discussed in greater detail below. The speed threshold values and the associated forward and reverse directional clutch values may be stored as look-up tables or in any suitable form.

Figure 4:
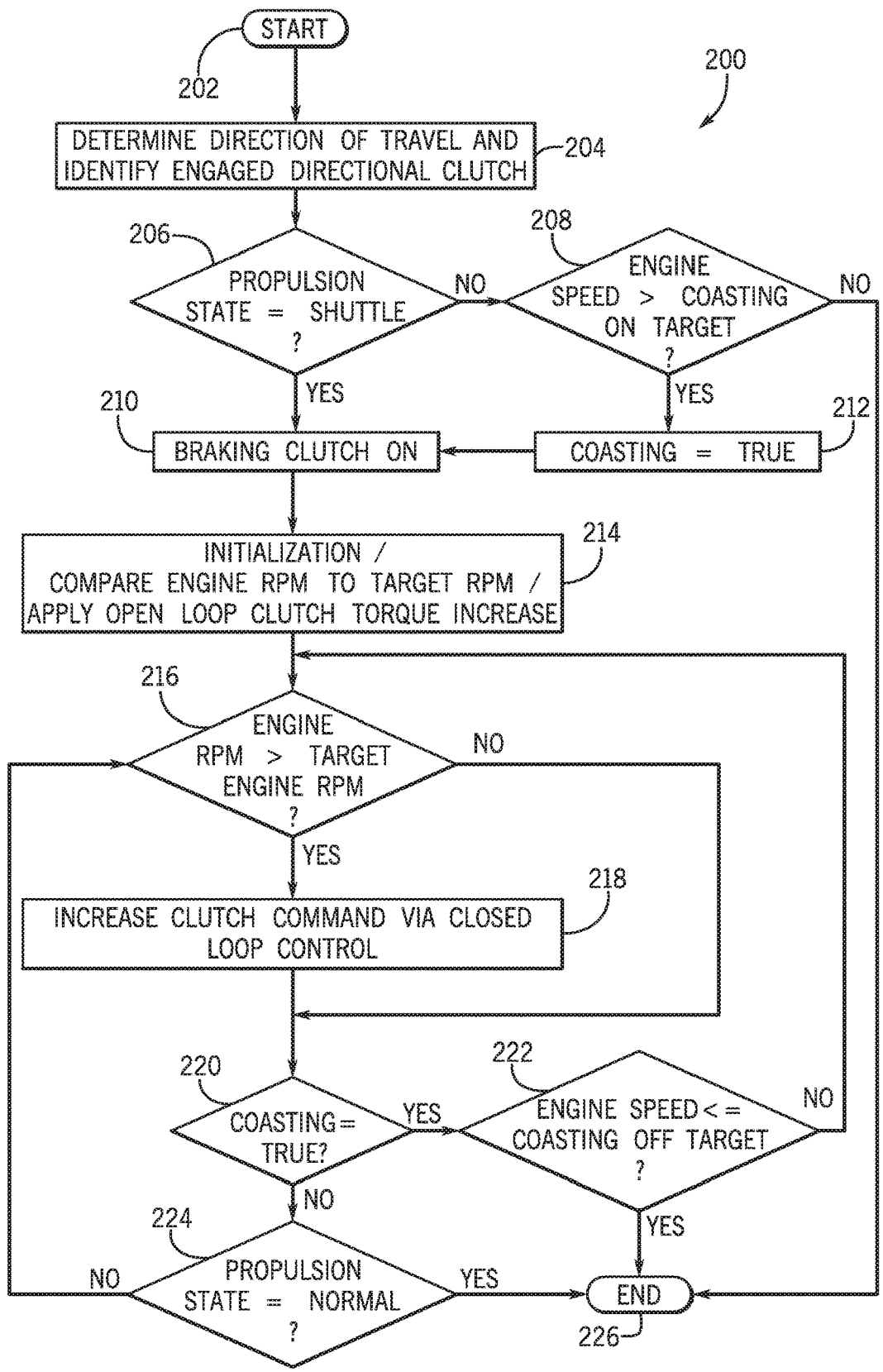
FIG. 4 is a flow chart showing use of the transmission clutch braking control system.

Referring now to FIG. 4, a flowchart illustrates a method 200 that may be performed by the controller 20 in accordance with the present disclosure.

The method 200 begins at step 202. Generally, the method 200 is implemented during typical operation of the vehicle 10, e.g., during forward and reverse propulsion, actuation of the work implements, and the like, in order to preform one or more tasks. As such, a number of systems in addition to the transmission clutch braking control system 16 are functioning at the same time as method 200. Such additional systems may include acceleration, braking, engine operation, drive strategies, and CVP operation, as examples. Even though these additional systems are typically implemented independently of the transmission clutch braking control system 16, some are discussed below to provide context.

In step 204, the method 200 determines the direction of travel and identifies if a directional clutch is engaged, e.g. if and which of the forward directional clutch 113 or the reverse directional clutch 115 is engaged is engaged by receiving information from the sensors 56, 58. In other words, the controller 20 determines that the vehicle 10 is operating in one of the directional modes or one of the direct drive modes in which the directional clutch 113, 115 is engaged in the determined direction of travel.

In step 206, the method 200 determines if a shuttle shift is occurring by receiving information from the sensor 52 associated with the operator lever 54 that receives the operator input for an intended direction or gear selection. As introduced above, the shuttle shift occurs when the vehicle 10 is transitioning from a forward direction to a reverse direction, or from reverse direction to a forward direction. As a result, initiation of the shuttle shift indicates that the vehicle will be essentially stopping as the vehicle changes direction and the directional clutches 113, 115 are swapped. In one example, this operation involves idling the engine 120 and CVPs 130, 134, as appropriate, and maintaining the engagement of the directional clutch 113, 115 in the direction of travel in a manner that is independent of the transmission clutch braking control system 16. However, the shuttle shift generally results in excess energy as the vehicle 10 and power train 12 are slowed. As the directional clutch 113, 115 is engaged in the direction of travel (step 204), it is anticipated that at least a portion of the excess energy resulting from the shuttle shift will be transferred to the engine 120 via backdriving through the power train 12, particularly since the engagement of the directional clutch 113, 115 is maintained until the vehicle 10 is substantially slowed or stopped. Moreover, in one example, it is anticipated that the amount of energy to be dissipated during the shuttle shift will otherwise result in exceeding the desired speed threshold of the engine 120. As such, in preparation of the shuttle shift identified in step 206, the method 200 proceeds to step 210 to initiate clutch braking, discussed below. In one example, the directional clutch 113, 115 to be used for braking is pre-filled and primed for braking action.

If it is determined that a shuttle shift is not occurring in step 206, the method 200 proceeds to step 208 and determines whether the engine speed is greater than a predetermined speed threshold (as a "coasting-on" threshold) by receiving information from the sensor 50. The predetermined speed threshold may represent a desired value or range of engine speed during operation. As introduced above, excess engine speed may occur in a number of scenarios, such was when traveling down an incline, in which the speed of the vehicle 10 may result in excess energy, some of which may be transferred to the engine 120 to increase engine speed. Although some amount of backdriving of the engine 120 in this manner may be beneficial to dissipate excess energy without requiring undue wheel braking or undue output side clutch braking, it is also desirable to maintain engine speed below the predetermined speed threshold.

If the engine speed is below the predetermined speed threshold in step 208, the method 200 is ended (represented by step 226) and the directional clutch that is not currently engaged is maintained in an off condition. In other words, the transmission clutch braking control system 16 does not engage a braking clutch, and the present iteration of the method 200 may terminate. Subsequently, the method 200 may be repeated to continue monitoring operation of the vehicle 10.

If the engine speed exceeds the predetermined speed threshold in step 208, the method 200 proceeds to step 212 in which a flag is set representing a coasting condition. Subsequently, the method proceeds to step 210 in which, as noted above, clutch braking is initiated.

As such, after the engine speed exceeds the predetermined speed threshold (step 208) and/or a shuttle shift has been detected (step 206), the method 200 implements step 214. In step 214, the controller 20 initializes the target engine speed at the current engine speed such that the current speed is compared to the target engine speed and the braking torque commands are generated via an open-loop control. As a result of steps 210 and 214, the other directional clutch that is not already engaged as detected in step 204 is engaged. For example, if the forward directional clutch 113 is detected as engaged at step 204, and a shuttle shift is detected in step 206 or the engine speed exceeds the predetermined speed threshold in step 208, then in step 214, the controller 20 sends a clutch torque command to the reverse directional clutch 115 to engage the reverse directional clutch 115 as a braking clutch. Or, as a further example, if the reverse directional clutch 115 is detected as engaged at step 204, and a shuttle shift is detected in step 206 or the engine speed exceeds the predetermined speed threshold in step 208, then in step 214 the controller 20 sends a clutch torque command to the forward directional clutch 113 to engage the forward directional clutch 113 as the braking clutch.

In one example, the clutch torque command to the respective braking clutch (e.g., clutch 113 or clutch 115) may be a first predetermined value selected in order to allow some slipping of the clutch elements while functioning to dissipate at least a portion of excess energy in the form of friction and heat. By engaging the other directional clutch in steps 210 and 214 as a braking clutch, rotation of the output shaft 110 is slowed. As such, the method 200 of the transmission clutch braking control system 16 operates to dissipate a first portion of any excess energy by backdriving the engine 120 (e.g., placing the energy on the engine flywheel and taking advantage of heat and friction loses in the engine 120) and a second portion of the excess energy by engaging the braking clutch (e.g., clutch 113 or clutch 115). During a shuttle shift, it is expected that the excess energy will otherwise increase the speed of the engine beyond the predetermined threshold in which the braking clutch should be engaged; and as a result, the braking clutch is automatically engaged during such a shuttle shift, while otherwise, the engine speed is monitored to determined when the braking clutch is desirable.

Subsequently, the method 200 proceeds to step 216, and the controller 20 determines whether the engine speed is greater than the predetermined speed threshold by receiving information from the sensor 50. If the engine speed is above the predetermined speed threshold, the method 200 proceeds to step 218 and the controller 20 sends a clutch torque command to the other directional clutch engaged at steps 212 and 214 to increase the applied torque. In one example, the controller 20 provides a clutch torque command at a value that exceeds the current clutch value (e.g., the first clutch value or the clutch value represented in the most-recent torque command).

The increased clutch commands in step 218 may be implemented via closed loop control. In some embodiments, the closed loop control utilizes PI (proportional-integral) or PID (proportional-integral-derivative) control as feedback mechanisms to slow the engine to the desired levels. In other examples, mechanisms other than PI or PID control may be utilized.

In step 216, if the engine speed is less than or equal to the target engine speed, the method 200 skips step 218 and proceeds to step 220. In step 220 of the method 200, the controller 20 evaluates the coasting condition. If the coasting condition exists (i.e., is true), the method 200 proceeds to step 222. In step 222, the controller 20 compares the engine speed to a further speed threshold. In this example, the further speed threshold may be lower than the predetermined speed threshold from step 208, e.g., for hysteretic operation. Further to step 222, the method 200 proceeds to step 226 in which the current iteration of the method 200 ends.

If, in step 220, the coasting condition is false, the method 200 proceeds to step 224 in which the propulsion state is evaluated. In particular, the controller 20 determines if the shuttle shift is still in progress. If the shuttle shift has been completed, the method 200 proceeds to step 226 in which the current iteration of the method 200 ends. In effect, this indicates that the excess energy resulting from the shuttle shift or otherwise occurring during operation has been dissipated by a combination of backdriving the engine 120 through the power train 12 and by engaging the other directional clutch within the power train 12 to provide input-side clutch braking. Subsequently, the method 200 may be repeated in order to implement the transmission clutch braking control system 16 during further vehicle operation as circumstances arise.

If, in step 224, the controller 20 determines that the shuttle shift is still occurring, the method 200 loops back to steps 216 and 218 in which the engine speed is evaluated (step 216) and, if necessary, the clutch command in increased (step 218) until the shuttle shift is completed and the target speed is achieved.

Accordingly, the present transmission clutch braking control system 16 provides an effective method for braking the speed of the engine 120 using only the directional clutches 113, 115. In one example, the transmission clutch braking control system 16 may utilize the engine 120 and clutch braking of the "other" directional clutch in order to dissipate excess energy during a shuttle shift or when the engine 120 may be subject to excessive backdriving, such as when on an incline. Alone, and particularly in combination, these aspects of the transmission clutch braking control system 16 may reduce or eliminate the use vehicle braking or other mechanisms for slowing the vehicle 10 and/or power train 12.

Also, the following examples are provided, which are numbered for easier reference.

1. A control system for operating a power train of a work vehicle having an engine configured to generate power for an output shaft, the control system comprising: a transmission arrangement positioned operatively between the engine and the output shaft and configured to selectively transfer the power from the engine to drive the output shaft in a first direction according to at least one forward mode and in a second direction according to at least one reverse mode, the transmission arrangement including: a forward directional clutch configured for engagement when transferring the power in the at least one forward mode, and a reverse directional clutch configured for engagement when transferring the power in the at least one reverse mode; and a controller, having a processor and memory architecture, configured to: determine if one of the forward directional clutch and the reverse directional clutch is engaged, evaluate a speed of the engine; and provide a torque command such that the other of the forward directional clutch and the reverse directional clutch is engaged to slow the speed of the engine when: a shuttle shift is initiated, or the speed of the engine exceeds a predetermined speed threshold.

2. The control system of example 1, wherein the controller is further configured to: reevaluate the speed of the engine; and provide the torque command such that the other of the forward directional clutch and the reverse directional clutch is disengaged when the speed of the engine meets or is below the predetermined speed threshold.

3. The control system of example 1, wherein the controller is configured to determine that the shuttle shift is initiated when the work vehicle is shifting from a reverse direction as the second direction to a forward direction as the first direction.

4. The control system of example 1, wherein the controller is configured to determine that the shuttle shift is initiated when the work vehicle is shifting from a forward direction as the first direction to a reverse direction as the second direction.

5. The control system of example 1, wherein the transmission arrangement includes at least two interconnected planetary gearsets supported on a common shaft.

6. The control system of example 5, wherein the transmission arrangement further includes a plurality of additional clutches configured to be operated to transfer the power from the engine to the output shaft according to a plurality of output speeds in each of the first and second directions.

7. The control system of example 1, wherein the controller is further configured to: reevaluate the speed of the engine; provide the torque command to increase pressure on the other of the forward directional clutch and the reverse directional clutch until the speed of the engine meets or is below the predetermined speed threshold.

8. The control system of example 7, wherein the controller is further configured to provide the torque command to disengage the other of the forward directional clutch and the reverse directional clutch when the speed of the engine meets or is below the predetermined speed threshold.

9. The control system of example 1, wherein the controller comprises: an engine speed module configured to receive an engine speed signal representing the speed of the engine; a shuttle shift module configured to receive a shuttle shift signal representing an initiation of the shuttle shift; a clutch module configured to receive a forward directional clutch position signal representing a position of the forward directional clutch and a reverse directional clutch position signal representing a position of the reverse directional clutch; and a torque command module coupled to the engine speed module, the shuttle shift module, and the clutch module and configured to generate the torque command based on the engine speed signal, the shuttle shift signal, the forward directional clutch signal, and the reverse directional clutch.

10. A work vehicle comprising: an engine; at least one continuously variable power source (CVP); an output shaft; a transmission arrangement positioned operatively between the output shaft and the engine and the at least one CVP such that the output shaft selectively receives power from one or both of the engine and the at least one CVP to drive the output shaft in a first direction according to at least one forward mode and in a second direction according to at least one reverse mode, the transmission arrangement including: a control assembly with a forward directional clutch configured for engagement when transferring the power in the at least one forward mode, and a reverse directional clutch configured for engagement when transferring the power in the at least one reverse mode, and a controller coupled to the transmission arrangement and the control assembly, the controller having a processor and memory architecture, configured to: determine if one of the forward directional clutch and the reverse directional clutch is engaged, evaluate a speed of the engine; and provide a torque command such that the other of the forward directional clutch and the reverse directional clutch is engaged to slow the speed of the engine when: a shuttle shift is initiated, or the speed of the engine exceeds a predetermined speed threshold.

11. The work vehicle of example 10, wherein the controller is further configured to: reevaluate the speed of the engine; and provide the torque command such that the other of the forward directional clutch and the reverse directional clutch is disengaged when the speed of the engine meets or is below the predetermined speed threshold.

12. The work vehicle of example 10, wherein the controller is configured to determine that the shuttle shift is initiated when the work vehicle is shifting from a reverse direction as the second direction to a forward direction as the second direction.

13. The work vehicle of example 10, wherein the controller is configured to determine that the shuttle shift is initiated when the work vehicle is shifting from a forward direction as the first direction to a reverse direction as the second direction.

14. The work vehicle of example 10, wherein transmission arrangement further includes a plurality of additional clutches configured to be operated to transfer the power from the engine to the output shaft according to a plurality of output speeds in each of the first and second directions.

15. The work vehicle of example 10, wherein the controller is further configured to: reevaluate the speed of the engine; and provide the torque command to increase pressure on the other of the forward directional clutch and the reverse directional clutch until the speed of the engine meets or is below the predetermined speed threshold.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A control system for operating a power train of a work vehicle having an engine configured to generate power for an output shaft, the control system comprising:
    a transmission arrangement positioned operatively between the engine and the output shaft and configured to selectively transfer the power from the engine to drive the output shaft in a first direction according to at least one forward mode and in a second direction according to at least one reverse mode, the transmission arrangement including:
        a forward directional clutch configured for engagement when transferring the power in the at least one forward mode; and
        a reverse directional clutch configured for engagement when transferring the power in the at least one reverse mode; and
    a controller, having a processor and memory architecture, configured to:
        determine whether a shuttle shift has been initiated;
        determine if one of the forward directional clutch and the reverse directional clutch is engaged; and
        automatically provide, based on the determination that the shuttle shift has been initiated, a torque command to prime or engage, at least partially, the other of the forward directional clutch and the reverse directional clutch.

2. The control system of claim 1, wherein the controller is further configured to:
    evaluate a speed of the engine; and
    provide the torque command such that the other of the forward directional clutch and the reverse directional clutch is disengaged when the speed of the engine meets or is below a predetermined speed threshold.

3. The control system of claim 1, further including an operator input lever coupled to the transmission arrangement; and
    wherein the controller is further configured to; receive a shuttle shift signal associated with initiation of the shuttle shift by the operator input lever upon which the determination of whether the shuttle shift has been initiated is made.

4. The control system of claim 3, wherein the controller is further configured to automatically provide, based on a determination that the shuttle shift has been terminated, a torque command to disengage the other of the forward directional clutch and the reverse directional clutch.

5. The control system of claim 1, wherein the transmission arrangement includes at least two interconnected planetary gearsets supported on a common shaft.

6. The control system of claim 5, wherein the transmission arrangement further includes a plurality of additional clutches configured to be operated to transfer the power from the engine to the output shaft according to a plurality of output speeds in each of the first and second directions.

7. The control system of claim 1, wherein the controller is further configured to:
    evaluate a speed of the engine;
    provide the torque command to increase pressure to the other of the forward directional clutch and the reverse directional clutch iteratively under closed loop control until the speed of the engine meets or is below a predetermined speed threshold.

8. The control system of claim 7, wherein the controller is further configured to provide the torque command to disengage the other of the forward directional clutch and the reverse directional clutch when the speed of the engine meets or is below the predetermined speed threshold.

9. The control system of claim 1, wherein the controller comprises:
an engine speed module configured to receive an engine speed signal representing the speed of the engine;
a shuttle shift module configured to receive a shuttle shift signal representing an initiation of the shuttle shift;
a clutch module configured to receive a forward directional clutch position signal representing a position of the forward directional clutch and a reverse directional clutch position signal representing a position of the reverse directional clutch; and
a torque command module coupled to the engine speed module, the shuttle shift module, and the clutch module and configured to generate the torque command based on the engine speed signal, the shuttle shift signal, the forward directional clutch position signal, and the reverse directional clutch position signal.

10. A work vehicle comprising:
an engine;
at least one continuously variable power source (CVP);
an output shaft;
a transmission arrangement positioned operatively between the output shaft and the engine and the at least one CVP such that the output shaft selectively receives power from one or both of the engine and the at least one CVP to drive the output shaft in a first direction according to at least one forward mode and in a second direction according to at least one reverse mode, the transmission arrangement including:
a forward directional clutch configured for engagement when transferring the power in the at least one forward mode; and
a reverse directional clutch configured for engagement when transferring the power in the at least one reverse mode;
an operator input lever coupled to the transmission arrangement and configured to initiate a shuttle shift;
a lever sensor associated with the operator input lever and configured to generate a shuttle shift signal; and
a controller operatively coupled to the operator input lever and the transmission arrangement, the controller, having a processor and memory architecture, configured to:
determine, based on receipt of the shuttle shift signal, that the shuttle shift has been initiated;
determine if one of the forward directional clutch and the reverse directional clutch is engaged; and
automatically provide, based on the determination that the shuttle shift has been initiated, a torque command to prime or engage, at least in part, the other of the forward directional clutch and the reverse directional clutch.

11. The work vehicle of claim 10, wherein the controller is further configured to:
evaluate a speed of the engine; and
provide the torque command such that the other of the forward directional clutch and the reverse directional clutch is disengaged when the speed of the engine meets or is below a predetermined speed threshold.

12. The work vehicle of claim 10, wherein the controller is configured to determine whether the shuttle shift has been terminated.

13. The work vehicle of claim 12, wherein the controller is configured to automatically provide, based on the determination that the shuttle shift has been terminated, a torque command to disengage the other of the forward directional clutch and the reverse directional clutch.

14. The work vehicle of claim 10, wherein the transmission arrangement further includes a plurality of additional clutches configured to be operated to transfer the power from the engine to the output shaft according to a plurality of output speeds in each of the first and second directions.

15. The work vehicle of claim 10, wherein the controller is further configured to:
evaluate a speed of the engine; and
provide the torque command to increase pressure to the other of the forward directional clutch and the reverse directional clutch iteratively under closed loop control until the speed of the engine meets or is below a predetermined speed threshold.

16. The work vehicle of claim 15, wherein the controller is further configured to provide the torque command to disengage the other of the forward directional clutch and the reverse directional clutch when the speed of the engine meets or is below the predetermined speed threshold.

17. The work vehicle of claim 10, wherein the controller comprises:
an engine speed module configured to receive an engine speed signal representing the speed of the engine;
a shuttle shift module configured to receive the shuttle shift signal;
a clutch module configured to receive a forward directional clutch position signal representing a position of the forward directional clutch and a reverse directional clutch position signal representing a position of the reverse directional clutch; and
a torque command module coupled to the engine speed module, the shuttle shift module, and the clutch module and configured to generate the torque command based on the engine speed signal, the shuttle shift signal, the forward directional clutch position signal, and the reverse directional clutch position signal.

18. The work vehicle of claim 17, further comprising:
an engine sensor associated with the engine and configured to generate the engine speed signal for the engine speed module;
a first clutch sensor associated with the forward directional clutch and configured to generate the forward directional clutch position signal; and
a second clutch sensor associated with the reverse directional clutch and configured to generate the reverse directional clutch position signal.

19. The work vehicle of claim 10, wherein the at least one CVP includes a first CVP and a second CVP that is electrically connected to the first CVP;
wherein the second CVP has a generator mode in which the second CVP generates electrical power from mechanical power supplied by the engine, and wherein the second CVP provides the generated electrical power to the first CVP; and
wherein the second CVP has a motor mode in which the second CVP provides power to the engine.

20. The work vehicle of claim 10, further comprising:
a variator that is operably connected to the engine and the CVP, the variator including a first planetary gearset and a second planetary gearset that are interconnected and supported on a common shaft; and
wherein the output shaft is operably connected to the variator.

* * * * *

UNITED STATES PATENT AND TRADEMARK OFFICE
CERTIFICATE OF CORRECTION

PATENT NO. : 10,975,959 B2
APPLICATION NO. : 16/371598
DATED : April 13, 2021
INVENTOR(S) : McKinzie et al.

Page 1 of 1

It is certified that error appears in the above-identified patent and that said Letters Patent is hereby corrected as shown below:

In the Claims

In Column 20, Claim 3, Line 39, delete "configured to; receive" and insert -- configured to receive --, therefor.

Signed and Sealed this
Thirteenth Day of July, 2021

Drew Hirshfeld
*Performing the Functions and Duties of the
Under Secretary of Commerce for Intellectual Property and
Director of the United States Patent and Trademark Office*